(12) United States Patent
Kocurek et al.

(10) Patent No.: US 12,410,295 B2
(45) Date of Patent: *Sep. 9, 2025

(54) SYSTEM AND METHOD FOR FLEXIBLE SEALANT WITH DENSITY MODIFIER

(71) Applicant: Polymer Adhesives, LLC, Dallas, TX (US)

(72) Inventors: Sandra Kocurek, Crowley, TX (US); Devin Kocurek, Crowley, TX (US); Jonathan Perriello, Granbury, TX (US)

(73) Assignee: Polymer Adhesives, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/986,305

(22) Filed: Nov. 14, 2022

(65) Prior Publication Data

US 2023/0082565 A1 Mar. 16, 2023

Related U.S. Application Data

(63) Continuation of application No. 16/862,459, filed on Apr. 29, 2020, now Pat. No. 11,505,672, and a continuation of application No. 16/862,463, filed on Apr. 29, 2020, now Pat. No. 11,505,673, said application No. 16/862,459 is a continuation of application No. 15/388,841, filed on Dec. 22, 2016, now Pat. No. 11,098,174, said application No. 16/862,463 is a continuation of application No. 15/388,841, filed on Dec. 22, 2016, now Pat. No. 11,098,174.

(60) Provisional application No. 62/273,970, filed on Dec. 31, 2015.

(51) Int. Cl.
| | |
|---|---|
| *C08J 9/32* | (2006.01) |
| *C08J 9/00* | (2006.01) |
| *C08J 9/10* | (2006.01) |
| *C08K 7/22* | (2006.01) |
| *C08K 9/02* | (2006.01) |
| *C09J 9/00* | (2006.01) |
| *C09J 11/00* | (2006.01) |
| *C09J 113/02* | (2006.01) |
| *C09J 133/08* | (2006.01) |
| *C09J 133/20* | (2006.01) |
| *C08K 3/26* | (2006.01) |
| *C08K 9/10* | (2006.01) |

(52) U.S. Cl.
CPC ............. *C08J 9/32* (2013.01); *C08J 9/0066* (2013.01); *C08J 9/101* (2013.01); *C08K 7/22* (2013.01); *C08K 9/02* (2013.01); *C09J 9/00* (2013.01); *C09J 11/00* (2013.01); *C09J 113/02* (2013.01); *C09J 133/08* (2013.01); *C09J 133/20* (2013.01); *C08J 2203/04* (2013.01); *C08J 2203/22* (2013.01); *C08J 2205/052* (2013.01); *C08J 2207/02* (2013.01); *C08J 2313/02* (2013.01); *C08K 2003/265* (2013.01); *C08K 9/10* (2013.01)

(58) Field of Classification Search
CPC ... C08J 9/32; C08J 9/0066; C08J 9/101; C08J 2203/04; C08J 2203/22; C08J 2205/052; C08J 2207/02; C08J 2313/02; C08J 2333/08; C08J 2333/20; C08K 7/22; C08K 9/02; C08K 9/10; C08K 2003/265; C09J 9/00; C09J 11/00; C09J 113/02; C09J 133/08; C09J 133/20
See application file for complete search history.

(56) References Cited

U.S. PATENT DOCUMENTS

| | | | |
|---|---|---|---|
| 4,005,033 A | 1/1977 | Georgeau et al. |
| 4,485,192 A | 11/1984 | Gibbs et al. |
| 4,699,810 A | 10/1987 | Blakeman et al. |
| 5,629,364 A | 5/1997 | Malmbom et al. |
| 5,688,860 A | 11/1997 | Croft |
| 5,916,671 A | 6/1999 | Dauber et al. |
| 6,214,450 B1 | 4/2001 | Wickert et al. |

(Continued)

FOREIGN PATENT DOCUMENTS

| | | |
|---|---|---|
| CA | 2621835 C | 6/2011 |
| CA | 2629868 C | 9/2016 |

(Continued)

OTHER PUBLICATIONS

BASF Corporation, Acronal 81 D na, Nov. 2009, 3 pgs.

(Continued)

*Primary Examiner* — K. Boyle
(74) *Attorney, Agent, or Firm* — Foley & Lardner LLP

(57) ABSTRACT

In certain embodiments, the disclosed sealant comprises a one-component, closed-cell, semi-foam, sealant using gas-filled, flexible, organic microspheres to create a product that is elastic and compressible under pressure without protruding in an outward direction when compressed, thereby allowing the applied sealant to compress in an enclosed, maximum-filled channel unlike typical mastic sealants (while retaining the ability to rebound). This allows the sealant to function as a gasket, and, once fully cured, to have properties including vibration damping, insulating, and condensation resistance. The sealant can be formulated as an air barrier or a vapor barrier and at various degrees of moisture resistance. It may be applied by different packaging variations including aerosol can (bag in can or bag on valve), airless sprayer, cartridge tubes, foil tubes, squeeze tubes, and buckets to be applied using a brush, trowel, spatula, etc. The disclosed sealant can also be formulated to be smoke-resistant and flame-resistant.

12 Claims, 1 Drawing Sheet

(56) References Cited

U.S. PATENT DOCUMENTS

| | | |
|---|---|---|
| 6,780,904 B2 | 8/2004 | Dudley et al. |
| 6,956,472 B1 | 10/2005 | Walcott et al. |
| 7,674,857 B2 | 3/2010 | Landon et al. |
| 8,324,340 B2 | 12/2012 | Burckhardt et al. |
| 8,492,471 B2 | 7/2013 | Albright et al. |
| 8,703,896 B2 | 4/2014 | Wang et al. |
| 8,784,989 B2 | 7/2014 | Kettner et al. |
| 8,802,750 B2 | 8/2014 | Abrami et al. |
| 8,863,458 B2 | 10/2014 | Noonan et al. |
| 8,865,812 B2 | 10/2014 | Phillips |
| 9,080,087 B2 | 7/2015 | Varkey et al. |
| 9,255,200 B2 | 2/2016 | Kulkarni et al. |
| 9,260,642 B2 | 2/2016 | Lam et al. |
| 9,315,705 B2 | 4/2016 | Van Loon et al. |
| 9,567,504 B2 | 2/2017 | Kulkarni et al. |
| 9,624,408 B2 | 4/2017 | Pietsch et al. |
| 9,644,109 B2 | 5/2017 | Guo et al. |
| 9,676,972 B2 | 6/2017 | Zhao et al. |
| 9,683,142 B2 | 6/2017 | Hluchan |
| 9,758,640 B2 | 9/2017 | Stockdale et al. |
| 9,765,252 B2 | 9/2017 | Roddy et al. |
| 9,802,446 B2 | 10/2017 | Dahlke et al. |
| 9,944,832 B2 | 4/2018 | Melnikova et al. |
| 10,005,931 B2 | 6/2018 | Alsoryai |
| 10,023,712 B2 | 7/2018 | Sakabe et al. |
| 10,099,459 B2 | 10/2018 | Huang et al. |
| 10,100,233 B2 | 10/2018 | Zajaczkowski et al. |
| 10,138,399 B2 | 11/2018 | Xiao |
| 10,150,870 B2 | 12/2018 | Kim |
| 10,174,227 B2 | 1/2019 | Lam et al. |
| 10,233,364 B2 | 3/2019 | Heemann et al. |
| 10,280,340 B2 | 5/2019 | Mammarella et al. |
| 10,316,169 B2 | 6/2019 | Lips et al. |
| 10,400,143 B2 | 9/2019 | Sommer et al. |
| 10,465,100 B2 | 11/2019 | Huang |
| 10,538,643 B2 | 1/2020 | Bardin et al. |
| 10,654,231 B2 | 5/2020 | Dowel |
| 10,676,568 B2 | 6/2020 | Grasmann et al. |
| 10,696,847 B2 | 6/2020 | Bindschedler et al. |
| 10,703,939 B2 | 7/2020 | Watanabe et al. |
| 2002/0006974 A1 | 1/2002 | Lucas et al. |
| 2003/0175497 A1 | 9/2003 | Kobe et al. |
| 2004/0034143 A1 | 2/2004 | Hubert et al. |
| 2004/0259981 A1* | 12/2004 | Krog ............... E04F 13/02 523/218 |
| 2005/0282014 A1 | 12/2005 | Johnston et al. |
| 2008/0097044 A1 | 4/2008 | Bhattacharjee et al. |
| 2009/0155472 A1* | 6/2009 | Grasse ............... E04D 7/00 524/556 |
| 2012/0015010 A1 | 1/2012 | Cummins et al. |
| 2012/0062367 A1 | 3/2012 | Warther |
| 2012/0207925 A1 | 8/2012 | Hornung et al. |
| 2013/0020410 A1 | 1/2013 | Conrad |
| 2013/0296449 A1 | 11/2013 | Peterson et al. |
| 2014/0072614 A1 | 3/2014 | Rhee et al. |
| 2014/0263659 A1 | 9/2014 | Kervinen et al. |
| 2017/0190864 A1 | 7/2017 | Kocurek et al. |
| 2019/0023948 A1 | 1/2019 | Moren |
| 2019/0085221 A1 | 3/2019 | Van Holen et al. |
| 2019/0177554 A1 | 6/2019 | Bohling et al. |
| 2019/0292424 A1 | 9/2019 | Maier et al. |
| 2019/0322957 A1 | 10/2019 | Grismala |
| 2020/0048431 A1 | 2/2020 | Hoevel et al. |
| 2020/0071512 A1 | 3/2020 | Buchholz et al. |
| 2020/0101451 A1 | 4/2020 | Hartman et al. |
| 2020/0255616 A1 | 8/2020 | Kocurek et al. |
| 2020/0255617 A1 | 8/2020 | Kocurek et al. |
| 2020/0371075 A1 | 11/2020 | Arigo et al. |
| 2020/0399501 A1 | 12/2020 | Cerecke |
| 2020/0406591 A1 | 12/2020 | Toni |
| 2021/0108114 A1 | 4/2021 | Detemmerman et al. |
| 2021/0122857 A1 | 4/2021 | Thompson |
| 2021/0130665 A1 | 5/2021 | Maier et al. |

FOREIGN PATENT DOCUMENTS

| | | | |
|---|---|---|---|
| CA | 3003833 A1 | 5/2017 | |
| CA | 3010012 A1 | 7/2017 | |
| CA | 2805621 C | 5/2018 | |
| CA | 3049545 A1 | 7/2018 | |
| CA | 3068862 A1 | 1/2019 | |
| CA | 3027057 A1 | 6/2019 | |
| CA | 2846451 C | 8/2019 | |
| CN | 1314421 A | 9/2001 | |
| CN | 101006445 A | 7/2007 | |
| CN | 102156942 A | 8/2011 | |
| CN | 104025556 A | 9/2014 | |
| CN | 104156746 A | 11/2014 | |
| DE | 16882443 T1 | 5/2019 | |
| JP | H04-063885 A | 2/1992 | |
| WO | WO-0100743 A1 * | 1/2001 | ............... B65B 7/14 |
| WO | WO-2017/042480 A1 | 3/2017 | |
| WO | WO-2017/085296 A1 | 5/2017 | |
| WO | WO-2017/117013 A1 | 7/2017 | |
| WO | WO-2017/118226 A1 | 7/2017 | |
| WO | WO-2017/127239 A1 | 7/2017 | |
| WO | WO-2017/207353 A1 | 12/2017 | |
| WO | WO-2018/030113 A1 | 2/2018 | |
| WO | WO-2018/069530 A1 | 4/2018 | |
| WO | WO-2018/108629 A1 | 6/2018 | |
| WO | WO-2018/178165 A1 | 10/2018 | |
| WO | WO-2018/187243 A1 | 10/2018 | |
| WO | WO-2019/161006 A1 | 8/2019 | |
| WO | WO-2019/166509 A1 | 9/2019 | |
| WO | WO-2020/007765 A1 | 1/2020 | |
| WO | WO-2020/042075 A1 | 3/2020 | |
| WO | WO-2020/072464 A1 | 4/2020 | |
| WO | WO-2020/091991 A1 | 5/2020 | |
| WO | WO-2020/091992 A1 | 5/2020 | |
| WO | WO-2020/110829 A1 | 6/2020 | |

OTHER PUBLICATIONS

Calleja et al., Where is the Glass Transition Temperature of Poly(tetrafluoroethylene)? A New Approach by Dynamic Rheometry and Mechanical Tests, Jul. 15, 2013, 28 pgs.
CertainTeed Corporation, CertaSeal Int, A new air sealing solution, 2019, 1 pg.
CertainTeed Corporation, CertaSeal Sell Sheet, May 9, 2019, 2 pgs.
CertainTeed Corporation, CertaSeal Specification Sheet, Apr. 2019, 2 pgs.
CertainTeed Corporation, CertaSeal_INT_Safety Data Sheet, Feb. 7, 2019, 10 pgs.
Definition of "Mastic." Complete Design, Inc. https://www.completedesign.cc/client-resources/dictionary-of-construction-terminology (Year: 2016), 1 pg.
Foreign Search Report on EP 16882443.1 Dtd Jun. 27, 2019.
International Preliminary Report on Patentability in International Patent Application No. PCT/US2016/068388, mailed Jul. 7, 2018, 8 pgs.
International Search Report and Written Opinion in International Patent Application No. PCT/US2016/068388, mailed Mar. 13, 2017, 10 pages.
Knauf Insulation GmbH, Ecoseal Architect Flyer, 2015, 1 pg.
Knauf Insulation GmbH, EcoSeal Water-Based Elastomeric Sealant Product Brochure, 2015, 4 pgs.
Knauf Insulation Inc., EcoSeal-Start-up-Clean-up-Procedures-Training-Manual-WEB, 2015, 12 pgs.
Non-Final Office Action on U.S. Appl. No. 16/862,459 Dtd Mar. 2, 2022.
Owens Corning Insulating Systems, LLC, EnergyComplete Product Data Sheet, Mar. 2013, 4 pgs.
Owens Corning Insulating Systems, LLC, EnergyComplete Sealant Summary Brochure, May 2013, 5 pgs.
Touch'nSeal Brochure—Go Green With AirStop Elastomeric Air Sealant—Instructions, Undated, 1 pg.
U.S. Appl. No. 15/388,841, Final Office Action dated Jan. 26, 2021, 13 pgs.

(56) References Cited

OTHER PUBLICATIONS

U.S. Appl. No. 15/388,841, Final Office Action dated Mar. 31, 2020, 19 pgs.
U.S. Appl. No. 15/388,841, Final Office Action dated Apr. 19, 2019, 20 pgs.
U.S. Appl. No. 15/388,841, Non-Final Office Action dated Aug. 12, 2020, 19 pgs.
U.S. Appl. No. 15/388,841, Non-Final Office Action dated Oct. 1, 2019, 26 pgs.
U.S. Appl. No. 15/388,841, Notice of Allowance dated Mar. 30, 2021, 8 pgs.
U.S. Appl. No. 15/388,841, Non-Final Office Action dated Nov. 21, 2018, 14 pgs.

\* cited by examiner

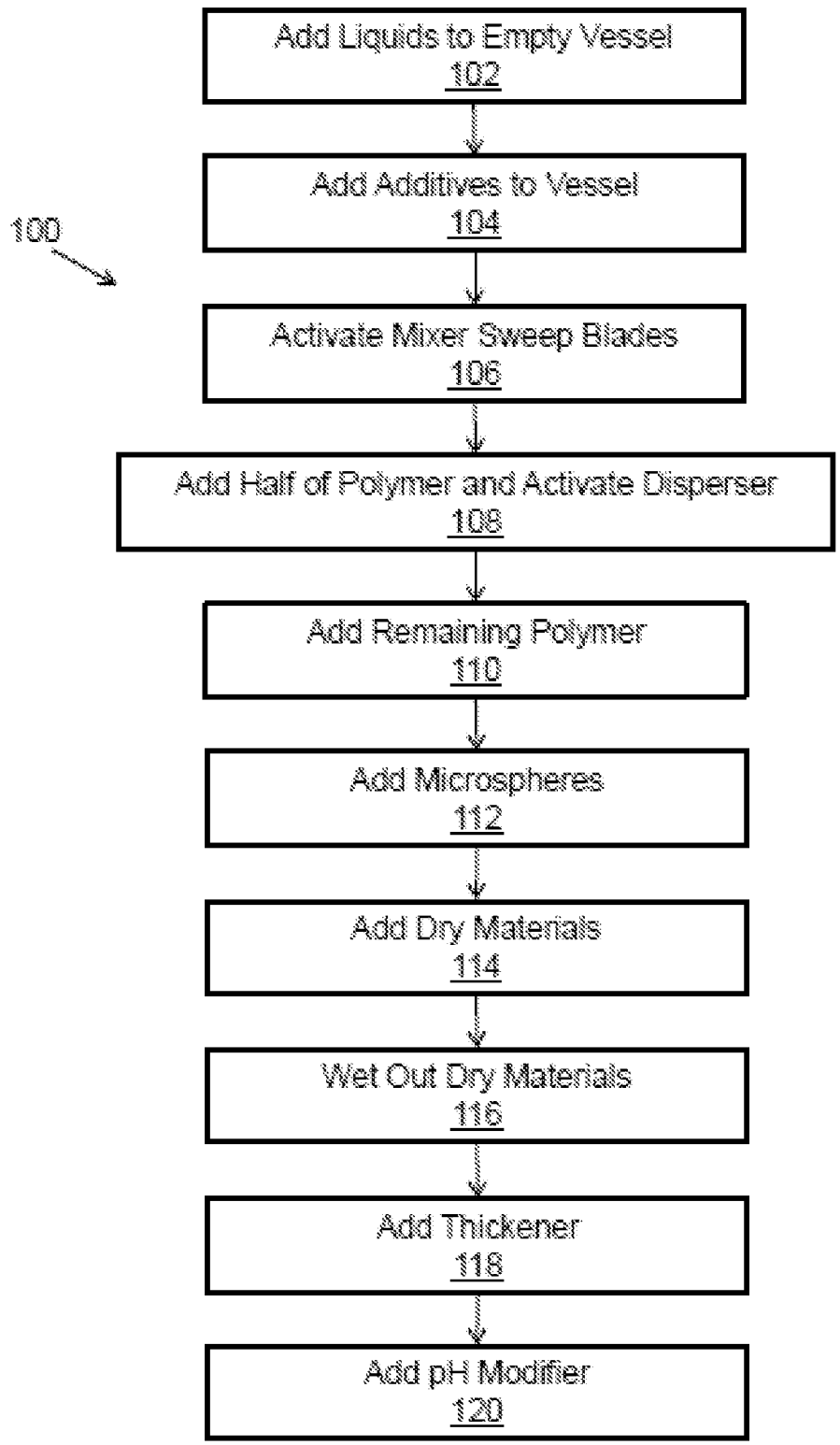

SYSTEM AND METHOD FOR FLEXIBLE SEALANT WITH DENSITY MODIFIER

CROSS-REFERENCE TO RELATED APPLICATIONS

Pursuant to 35 U.S.C. § 120, this application is a continuation of U.S. patent application Ser. No. 16/862,459 entitled "System and Method of Flexible Sealant with Density Modifier," filed Apr. 29, 2020, and naming Sandra Kocurek, Devin Kocurek, and Jonathan Perriello as inventors, which is a continuation of U.S. patent application Ser. No. 15/388,841, entitled "System and Method for Flexible Sealant with Density Modifier," filed Dec. 22, 2016, and naming Sandra Kocurek, Devin Kocurek, and Jonathan Perriello as inventors, which is a non-provisional of U.S. Provisional Patent Application Ser. No. 62/273,970, entitled "System and Method for Flexible Sealant with Density Modifier," filed Dec. 31, 2015, and naming Sandra Kocurek, Devin Kocurek, and Jonathan Perriello as inventors, the disclosures of which are incorporated herein by reference in their entirety.

This application is also a continuation of U.S. patent application Ser. No. 16/862,463 entitled "System and Method for Flexible Sealant with Density Modifier," filed Apr. 29, 2020, and naming Sandra Kocurek, Devin Kocurek, and Jonathan Perriello as inventors, which is a continuation of U.S. patent application Ser. No. 15/388,841, entitled "System and Method for Flexible Sealant with Density Modifier," filed Dec. 22, 2016, and naming Sandra Kocurek, Devin Kocurek, and Jonathan Perriello as inventors, which is a non-provisional of U.S. Provisional Patent Application Ser. No. 62/273,970, entitled "System and Method for Flexible Sealant with Density Modifier," filed Dec. 31, 2015, and naming Sandra Kocurek, Devin Kocurek, and Jonathan Perriello as inventors, the disclosures of which are incorporated herein by reference in their entirety.

FIELD

The present disclosure relates generally to sealant compounds. More specifically, but not by way of limitation, the present disclosure relates to a system and method for a flexible sealant with a density modifier and optional flame resistance.

BACKGROUND

The statements in this section merely provide background information related to the present disclosure and may not constitute prior art.

Conventional sealants do not contain sufficient structural properties for all desired uses or methods of application. For example, when cured, typical one-component mastic sealants are limited in compressibility and tend to deform in a direction outward from the bead line in which they are applied. Typical mastic sealants are also too rigid to create an adequate sealing gasket for building materials such as, for example, gypsum drywall. Although high-movement elastomeric sealants have a higher extension capability, they are unable to compress without protruding in some other direction and, therefore, cannot compress in a closed, maximum-filled chamber (e.g., a can). Additionally, when many spray foams are cured, breaching the skin of the cured foam compromises the foam's integrity, thereby reducing or nullifying the ability of the foam to provide an adequate seal. Regarding application, two-component spray foams are dependent on off-gassing chemicals such as isocyanates that are known allergens and sensitizers, and other spray foams often utilize highly flammable propellants making them especially undesirable for fire- and smoke-resistant applications. Two-component spray foam systems often require specialized application tools. Such foam systems may result in difficulty in controlling uniformity in cell size and cleaning the application equipment or foam over-spray. As such, there is a desire for other sealant compounds.

SUMMARY

In one embodiment, the present disclosure provides a sealant composition comprising: up to about 80 vol % of a polymeric dispersion; from about 20 vol % to about 65 vol % of a density modifier; and from about 0 vol % to about 10 vol % of one or more additives.

In another embodiment, the present disclosure provides a method of manufacturing a sealant composition, the method comprising: mixing a liquid and additives, wherein the additives comprise from about 0 vol % to about 10 vol % of the sealant composition; dosing a polymeric dispersion into the mix of liquid and additives, wherein the polymeric dispersion comprises up to about 80 vol % of the sealant composition; and dosing a density modifier, wherein the density modifier comprises from about 20 vol % to about 65 vol % of the sealant composition.

Further embodiments and apparatuses, including other areas of applicability, will become apparent from the description provided herein. It should be understood that the description and specific examples are intended for purposes of illustration only and are not intended to limit the scope of the present disclosure in any manner.

BRIEF DESCRIPTION OF DRAWINGS

Embodiments are illustrated by way of example in the accompanying FIGURES not necessarily drawn to scale, in which like numbers indicate similar parts, and in which:

FIG. 1 illustrates a flowchart of an example method for manufacturing the disclosed composition.

DETAILED DESCRIPTION

In the following detailed description, numerous specific details are set forth to provide a thorough understanding of the present disclosure. However, those skilled in the art will appreciate that the present disclosure may be practiced, in some instances, without such specific details. Additionally, for the most part, specific details, and the like, have been omitted inasmuch as such details are not considered necessary to obtain a complete understanding of the present disclosure, and are considered to be within the understanding of persons of ordinary skill in the relevant art.

The present disclosure provides, in some embodiments, a product composition that is a latex system comprising a one-component, closed-cell, semi-foam, mastic sealant using gas-filled, flexible, organic microspheres to create a product that is elastic, compressible under pressure (while retaining the ability to rebound), able to function as a gasket, and, once fully cured, has properties that include vibration damping, insulating, and condensation-resistant. In some embodiments, the disclosed product composition can be applied by different packaging variations for differing constructional needs. Such packaging variations include, for example, an aerosol can (bag in can or bag on valve), cartridge tubes, foil tubes, squeeze tubes, and buckets to be applied using a brush, trowel, spatula, airless sprayer, etc. In some embodiments, the disclosed product composition can also be formulated to be smoke-resistant and flame-resistant to meet various building codes. Furthermore, unlike typical mastic sealants, the disclosed product composition can be formulated to have a higher compression capability than extension capability, thereby allowing the applied composition to compress without deforming in directions outside of its applied bead line.

As discussed herein, the disclosed product composition may be formulated for use in many fields of application. For example, in one or more embodiments disclosed herein, the product composition may be formulated as a sealant or coating for ventilation ducts, joints, cracks, gaps, pipe and cable penetrations, gypsum drywall, and other areas of application. In other embodiments, the product composition may be formulated as an adhesive, for example, for parquet, wood flooring, or other applications. In some embodiments, the disclosed product composition may be formulated to provide joint/structural vibration damping, to provide insulation, for anti-condensation uses, or for smoke- and flame-resistant applications.

In some embodiments, vibration damping characteristics allow the product to be used to reduce noise transmission when sealing gaps or adhering substrates by dissipating the sound vibrations and reducing their audible noise detection. Examples include sealing gaps in wall cavities that would otherwise allow sound to freely travel, or adhering flooring such as parquet flooring to a subfloor to reduce the noise transmission when objects strike the floor. The vibration damping characteristics, and the capability of the composition to compress and deform in multiple directions without protruding in another direction, allows the composition to perform well as a sealant in a seismic joint system. As discussed herein, the ability of the composition to compress and/or deform without protruding means that the composition, when compressed or deformed in a particular direction, does not respond to the force of the compression or deformation of the composition by extending or expanding outwardly from the composition, but instead compresses internally due to the compressibility of the microspheres. This ability of the composition to be compressed under applied pressure in a cured film or bead without protruding out from the original cured form provides good gasket properties, even in an enclosed gap or channel.

The composition is capable of compression in both the wet phase and in its cured state. Generally, the wet-phase composition is capable of achieving a range of compression of about 15% to about 45% of the wet-phase volume of the composition. This allows the composition to be compressed in a closed chamber, such as an aerosol can, to achieve greater amounts of the product in the closed chamber than would be achievable with the uncompressed composition. In other words, the composition, in its wet phase, may be compressed (e.g., by about 15%-45%) to fit a greater amount of the composition in the closed chamber. When in its cured state, the composition is capable of achieving a range of compression of about 50% to about 95% of the composition's cured volume (e.g., the size of an applied composition bead or film), while maintaining the ability to rebound to the original cured volume (e.g., the original size of the applied composition bead or film). By way of contrast, other sealant compositions cannot be compressed in the manners discussed herein and, therefore, cannot achieve these effects.

In some embodiments, the disclosed product composition may be formulated to produce an aqueous or non-aqueous product that is a cross between a typical mastic sealant and a cellular foam product. In order to produce such products, various components are used to develop the backbone that supports the semi-foam final product. These various components may include: a polymeric dispersion; a surfactant package; a biocide package; a freeze/thaw package; rheology modifying additives; pH modifying additives; a defoamer additive; a plasticizer additive; a coalescing agent; various fillers; adhesion promoters (coupling agents); and, in some embodiments, smoke- and flame-resistant additives. In some embodiments, these various components are combined with a high level of gas-filled, flexible microspheres to produce the disclosed one-component, semi-foam product composition. In some embodiments, the microspheres may include, for example, Dualite® (e.g., Dualite® E065-135D), Expancel® (e.g., Expancel® 909 DET 80 d15 or MI90 DET 80 d15), and combinations thereof.

In some embodiments, the polymeric dispersion can be selected to withstand heavy loading with fillers, including the gas-filled microspheres. The polymeric dispersion is typically based upon acrylics or polyacrylates, but is not limited to these. Some examples of possible dispersions include: vinyl acrylic, styrenated acrylic, vinyl acetate, vinyl chloride, vinylidene chloride, ethylene vinyl acetate, butadiene styrene, butadiene acrylonitrile, acrylate acrylonitrile, and other dispersions of polymers and copolymers. Some non-aqueous options include: urethanes, silicones, polysulfides, styrene butadiene, SBS block copolymers, isoprene, silyl modified polyether, silyl modified polyurethane, and others.

The choice of polymeric chemical composition may depend upon the intended end use of the product. For example, lower cost/performance products that can function with lower movement and compression attributes may use the higher-Tg (glass transition temperature), lower-cost polymeric raw materials. Applications for medium movement and compression applications may use medium performance polymeric raw materials. Similarly, applications for higher movement and compression applications may use higher performing polymeric raw materials. In some embodiments, small particle size, low-Tg elastomeric polymer dispersions result in optimum performance for the finished product composition. Examples of such formulations are provided below in Tables 1-6.

In some embodiments, the surfactant package is selected to aid in protecting the polymeric dispersion and wet out the fillers for shelf life stability. In some embodiments, the surfactant package also aides in the distribution of the particles in the liquid phase to produce a stable formulation that has viscosity stability and does not separate. This includes a wetting/emulsifying surfactant that is selected to be compatible with the polymeric dispersion, and to have the appropriate hydrophilic-lipophilic balance (HLB) value and melt point to support the finished product through electrolyte and mechanical stabilization of the polymer.

In some embodiments, the surfactant can be cationic, anionic, nonionic, Gemini (dimeric), or a combination thereof. Examples of such surfactants include: alkylphenol ethoxolate (APEO) (triton x-405) or APEO free such as Carbowet® 109, ZetaSperse® 179, Disponil® AFX 4070, and combinations thereof. In some embodiments, the surfactant is nonionic and, preferably, APEO (alkylphenol ethoxolate) free.

The surfactant package includes a dispersant that deflocculates the solids within the formulation allowing increased loading levels and further stabilization. Depending upon the chosen fillers, whether inorganic and/or organic, the dispersant can be low molecular weight or high molecular weight. Low molecular weight dispersants are generally more compatible with inorganic fillers. In some embodiments, especially when using clay fillers, a secondary dispersant such as tetrasodium pyrophosphate (TSPP) or potassium tripolyphosphate anhydrous (KTPP) are used to further increase the stability of the fillers and prevent re-agglomeration or flocculation. In some embodiments, such as for this highly filled type of formulation, the high molecular weight dispersant may be chosen for increased stability due to higher steric hindrance of re-agglomeration. Polyacrylates are preferred, in some embodiments, with anchoring groups that absorb onto the surface of the organic filler through hydrogen bonding, dipole-dipole interactions, and London-Van der Waals forces, which creates a strong steric hindrance to prevent re-agglomeration and also aids with inorganic fillers due to the high number of bound sites. The stability provided by the surfactants aides freeze/thaw stability.

In some embodiments, the biocide package is selected to protect the product composition in the in-can wet phase as well as the cured-film (dry film) phase from bacterial, fungus, and mildew attack during the shelf life and service life of the product under normal storage and usage conditions. In some embodiments, a broad spectrum biocide is chosen for the wet phase protection to keep away microbial growth of bacteria, fungi, and algae during the manufacturing, packaging, and in-can lifespan of the final formulation. In some embodiments, a low- or zero-VOC product is used. Examples of a low-VOC product include Mergal® 758 or Mergal® K12N. A second broad spectrum (a dry film phase) biocide may be chosen, in some embodiments, to protect the cured film from microbial attach from bacteria, fungi, mold, and mildew. In some embodiments, the second broad spectrum biocide (i.e., dry film phase biocide) may include a low- or zero-VOC product. Examples of a zero-VOC product include Polyphase® 678, or zinc oxide. Optimum protection loading levels may be tested by thorough microbiological testing.

In some embodiments, the freeze/thaw package is selected to protect the product composition during its storage shelf life from five or more freeze/thaw cycles resulting from ambient temperatures dropping below 32° F. The freeze/thaw package can be selected from a group of various freeze/thaw agents including ethylene glycol, propylene glycol, methanol, Rhodoline FT100, urea, and others. Although glycols are common, in some embodiments, urea may be preferred due to its zero-VOC content. In some formulations, urea may act as an aide for smoke and flame resistance due to its ability to function similar to a blowing agent for an intumescent package of raw materials, rather than as a fuel source.

In some embodiments, the rheology modifying additives are selected to adjust the rheology as needed to reach a specific viscosity and flow of the finished product to meet application requirements. These rheology modifying additives can include alkali swellable emulsions (ASE), associative thickeners, cellulosic thickeners, fumed silica thickeners, modified caster oils, clays, polyamides, and specialty mineral-based thickeners. In some embodiments, the selected rheology modifying additives and loading level may be dependent upon desired final performance characteristics such as rheology (thixotropic, thermoplastic, pseudoplastic, dilantant), slump resistance, hydrophilic or hydrophobic performance, sprayability, extrudability, brushability, and others.

In some embodiments, pH modifying additives may be selected to help stabilize the polymeric dispersion and/or activate the rheology modifier. These pH modifying additives can include ammonium hydroxide, potassium hydroxide, caustic soda, sodium silicate, Advantex, Vantex T, AMP, AMP-95, MEA, DEA, TEA, KOH, and others. In some embodiments, the selected pH modifying additives and loading level may be dependent upon several factors including, for example, system compatibility; substrate compatibility; and desired final performance characteristics such as VOC content; staining resistance; and, in the case of sodium silicate, some assistance with smoke and flame resistance due to its ability to intumesce. In some embodiments, it may be preferred to use a pH modifier that is not a VOC contributor. For smoke- and flame-resistant formulation, the pH modifier additives may include a solution of water, caustic soda, and sodium silicate.

In some embodiments, the defoamer additive is used to aide in reduction of any air entrapment during the manufacturing, packaging, and storage of the product that can lead to fracture points in a highly filled system which can then diminish the cohesive strength in the final film. This can include insoluble mineral oils, silicones, certain alcohols, stearates, and glycols. In embodiments for water-borne sealants, the defoamer additive may be mineral-oil based.

In some embodiments, the plasticizer additive may be used to impart flexibility, flowability, softness, reduce brittleness, and in some cases, increase the resistance to smoke and flame. The plasticizer additive may include a variety of options including benzoates, phthalates, phosphate esters, and others. An example of such a plasticizer may include, for example, Santicizer® 148. To avoid plasticizer migration issues and potential staining issues, a polymeric binder that does not require the use of plasticizers may be used in the final system.

The coalescing agent may be used, in some embodiments, to soften the polymeric binder, lower the minimum film forming temperature, and allow the polymeric binder to flow as water leaves the sealant to create an optimum film. In some embodiments, the coalescing agent solvates the polymeric binder, evaporates slower than the water, and has low solubility in water. In some embodiments, use of a binder that does not require a coalescing agent may keep the volume solids of the sealant high.

Various fillers may be used to add various attributes to the final formulation of the product composition. Such attributes include: air blocking, structural reinforcement, moisture resistance, condensation control, thermal resistance, smoke and flame resistance, softness, viscosity build, reduced shrinkage, altered density, changed electro-conductivity, improved scrub resistance, reduced tack, altered optical properties, altered permeability, color, vibration dampening, insulating, and others.

For example, in some embodiments, it may be desirable to use a particular filler to provide a pigment for coloring the composition for different applications. For example, iron oxide may be used as a filler to give the compound a red color when the composition is formulated as a firestop. In other embodiments, a particular filler may be used to color-match the formulation to a specific application. For example, a paint or stain may be added to the formulation as a filler such that the composition, when applied and/or cured, achieves a particular color.

In some embodiments, the composition may be modified to achieve a particular textural appearance. For example, the composition may be modified to have a gritty texture that matches the appearance of mortar when dried. This embodiment may be useful for filling pipe penetrations in brick, such as around exterior faucets, because the composition can provide the flexibility and other sealant properties discussed herein while also giving the appearance that the pipe penetration is filled with mortar. In some embodiments, the appearance of mortar may be achieved by using large-particle-size, compressible microspheres and replacing some of the filler in the base formula with a combination of coarse fillers (such as hollow ceramic microspheres) that give the appearance of mortar sand (e.g. Fillite or Extendospheres) but still allow the end product to retain the light weight density. To further enhance the appearance of mortar, a hollow, colored, light-weight sphere (such as, for example, the phenolic Phenoset sphere) can be added in small quantities for the appearance of red brick sand specs while still maintaining a low density in the sealant. In some embodiments, graphite or color-coated, mica black specs can be added for the appearance of black sand specs. Alternately, irregular-shaped, matted, plastic or polymeric chips or glitter can be added to simulate reddish and black sand specs. As mentioned above, in such embodiments, the end product has the appearance of mortar, but the flexibility and compressibility of a semi-foam sealant that can withstand pipe movement when attaching a hose to a faucet or other penetrations that may have pipes that move or vibrate during use.

In some embodiments, fillers such as mica, aluminum trihydrate (ATH), and/or magnesium hydroxide may be used for smoke- and flame-resistant formulations of the product composition. Mica contributes to suspension, reduced cracking, reduced shrinking, increased moisture resistance, added heat resistance, increased stiffness without compromising flexural strength, low coefficient of expansion and heat dimensional stability, anti-vibration, sound damping, and insulating properties. ATH and magnesium hydroxide decompose endothermically which leads to a temperature reduction and functions as a heat sink to retard pyrolysis and burn rate. The water that is released during decomposition dilutes combustion gases and toxic fumes. Smoke suppression is thereby achieved through this process. The aluminum trihydrate decomposes at a lower temperature than the magnesium oxide. Combining the two into the semi-foam further suppresses the smoke development in a synergistic manner.

For a semi-foam product composition that does not need to meet a smoke- and flame-retardant specification, a range of different fillers are optional depending on the end product's application requirements. These fillers may include talc, calcium carbonate, kaolin clays, calcined clays, fumed silica, precipitated silica, carbon black, graphite, ceramic microspheres, phenolic microspheres, glass microspheres, alumino-silicate microspheres and others. Examples of these formulations are provided below in Tables 1-6.

In some embodiments, adhesion promoters or coupling agents may be used to increase the adhesion of the product composition to various difficult-to-adhere-to substrates and to enhance moisture resistance. In some embodiments, this selection of adhesion promoters may be based on silane or stabilized non-toxic metal/organofunctional chemistry. In some embodiments, the addition of an adhesion promoter or coupling agent reduces the moisture at the substrate/sealant interface, and improves moisture resistance, temperature resistance, chemical resistance, and/or binds the organic polymers to the mineral or siliceous fillers.

In some embodiments, smoke- and flame-resistant additives may be used to create sealants that meet fire code regulations. In such embodiments, the selection of additives used affects the product composition's ability to meet specific requirements of varying building codes. In some embodiments, the semi-foam product composition contains a high loading level of gas-filled microspheres, which intuitively suggests that the final formulation would be a high risk for fire when the binder and the filler are potential fuel sources for a flame, unless the binder is flame resistant, as in the case of halogenated polymers. One embodiment includes choosing a halogenated binder, and selecting the other constituents around this choice. Thus, for binders that are not halogenated, all other choices may be more impactful during the raw materials selection process to avoid providing a fuel source, rather than smoke- and flame-retardant.

In some embodiments, a smoke- and flame-retardant semi-foam sealant includes aluminum trihydrate and/or magnesium hydroxide along with mica for fillers. Adding ammonium polyphosphate or ammonium phosphate may further increase the smoke- and flame-retardant properties in some embodiments. Using prilled urea, in some embodiments, for the freeze/thaw agent also provides a blowing agent in the presence of a carbon source and an acid source to provide some intumescent properties. Using sodium silicate as part of a pH modifying solution (e.g., solution of water, sodium silicate, and caustic soda) may also provide some intumescent properties. In some embodiments, using acrylonitrile- or styrenated-acrylic-based polymers as an alternative to halogenated polymers resists flame spread.

In some embodiments, it may be preferable to avoid the use of coalescing agents, plasticizers, and glycols to reduce added fuel sources to the smoke- and flame-retardant semi-foam sealant. In such embodiments, it may be preferable to use thickeners that are not fuel sources such as laponite, attapolgite, bentonite, or others.

In some embodiments, the addition of expandable graphite greatly increases the smoke and flame resistance through intumescent response to heat. Using the expandable graphite in conjunction with optimum fire resistant additives and the light weight compressible gas-filled microspheres may result in a light-weight, highly compressible, gasketing, semi-foam sealant that can function as a firestop and/or fire retardant sealant with added features such as anti-condensating surface, vibration damping, sound damping (acoustical absorption), and insulating properties. Further advantages are disclosed herein. Sample formulations may be found in Tables 1-6.

In addition to variations of the foregoing components, a high level of gas-filled, flexible microspheres may be included to change the sealant into a one-component, semi-foam product composition with one or more of the performance characteristics disclosed herein. In some embodiments, the amount of microspheres is about 20 to 65 percent microspheres by volume. In some embodiments, the shell of the microsphere includes a thermoplastic polymer, typically constructed of acrylonitrile, copolymer of acrylonitrile, and other acrylics, vinylidene chloride, or methyl methacrylate. The shell may be created by encapsulating a blowing agent such as isopentane or isobutene (or similar gas with a boiling point lower than the softening point of the microsphere shell) with the polymeric shell material and expanding the shell by heating the mixture. This allows the polymeric shell to soften and the blowing agent to expand. Once cooled, the shell maintains the expanded diameter.

The shell of the microsphere can be coated with calcium carbonate or remain uncoated. Due to the polymeric nature of the shell, the expanded microspheres can be deformed or compressed without rupturing. When the compressed microspheres are returned to an ambient pressure state, they rebound back to their original expanded shape. In some embodiments, the compressibility of the microspheres allows the product to compress up to 45% in the liquid phase in a container, and up to 95% once applied and fully cured. This compressible attribute allows the semi-foam sealant to be applied via spray despite the high volume solids content of the finished product. It also allows the finished product to be heavily loaded under pressure into an aerosol at a higher sealant volume than the actual physical volume of the aerosol can to maximize the applied linear footage of the sealant upon application, when compared to non-compressible sealants. The compressibility also allows a high volume solids sealant to be applied by an aerosol can with extended coverage. This compressibility also allows the product to be molded or tooled after being applied without losing its sealing properties. This is because the foam is based on closed cell technology.

The final product composition can use one or a combination of multiple grades of microspheres to reach the desired balance of compressibility, elongation, cohesive strength, and density. In some embodiments, the microspheres have a particle size ranging from 15 μm to 200 μm. In some embodiments, the preferred particle size range is from 60 μm to 90 μm with a density of approximately 0.015 g/cm$^3$ to create a good balance of attributes in the finished product. In some embodiments, the microspheres have a density ranging from about 6.5 kg/m$^3$ to about 100 kg/m$^3$. These specifications allow a finished product composition that, once applied and cured, becomes a syntactic foam product with the ability to be compressed 50 to 95% of its original bead size without deformation in a direction outward from the cured sealant bead diameter, and to then rebound once the applied pressure is released. This functionality gives the finished, cured product the ability to be elastic, compressible, vibration damping, gasketing, insulating, and anti-condensating. Additionally, the product composition has sufficient cohesive strength to perform well for various applications including in areas prone to vibrating, shifting, or otherwise moving. The product can be applied in multiple delivery systems including sprayable systems such as airless sprayers and aerosol cans, and other systems such as brush, trowel, spatula, cartridge tube, foil tube, and squeeze tube. With special selection of raw materials and the addition of fire retardant additives, the cured finished product can also be formulated to be a fire retardant or firestop sealant.

In some embodiments, the finished product composition results in a mastic sealant that is greater than 70% solids by volume, with the ability to be applied by spray application.

In some embodiments, the latex system is highly loaded with gas-filled microspheres resulting in a highly filled mastic sealant that does not require plasticizer, thereby improving resistance to staining, eliminating plasticizer migration, eliminating plasticizer off-gassing, and improving compatibility with substrates such as CPVC.

In some embodiments, the latex system is highly loaded with gas-filled microspheres resulting in a highly filled sealant that does not require coalescing agents for film formation and has improved compatibility with substrates such as CPVC.

In some embodiments, the latex system is highly loaded with gas-filled microspheres that can be formulated to be a light-weight, compressible, flexible firestop and/or fire retardant sealant.

The following tables provide various example formulations. Table 1 is an example formula for a product having a density of 0.57 g/cm$^3$. The formula in Table 1 is an aqueous formulation capable of over 85% compression. It may be used for sealing cracks, is excellent for aerosol can application, is moisture resistant, and is an excellent base formula for outdoor applications such as filling pipe penetrations, mortar repair, etc. The formula in Table 1 exhibits the various attributes listed with the exception of smoke and flame resistance. It is excellent for sealing in buildings with known joint movement, is acceptable to addition of pigments for aesthetic appearance, and is compatible with CPVC piping.

TABLE 1

| Raw Material Category | Raw Material | % Weight | % Volume |
| --- | --- | --- | --- |
| Acrylic Polymer | Rhoplex EC-3814 | 85.14 | 46.92 |
| Diluent | Water | 5.91 | 3.36 |
| Defoamer | Foamaster 75 | 0.69 | 0.46 |
| Surfactant | Carbowet 109 | 1.02 | 0.54 |
| Biocide | Polyphase 678 | 0.20 | 0.09 |
| Biocide | Mergal K12N | 0.30 | 0.16 |
| Freeze/Thaw Additive, Blowing Agent | Prilled Urea | 2.20 | 0.94 |
| Dispersant | Orotan 731 dp | 0.39 | 0.34 |
| Microspheres | Expancel 909 DET 80 d15 | 1.22 | 46.21 |
| Filler | Talc MP4526 | 1.97 | 0.40 |
| HASE | Polyphobe TR115 | 0.37 | 0.20 |
| pH Modifier | Ammonia | 0.59 | 0.37 |
| | | 100 | 100 |

Table 2 is an example formula for a product having a density of 0.52 g/cm$^3$. The formula in Table 2 is an aqueous formulation capable of over 87% compression. It may be used for sealing cracks, is excellent for aerosol can application, is moisture resistant, and is an excellent base formula for outdoor applications such as filling pipe penetrations, mortar repair, etc. and exhibits the various attributes listed with the exception of smoke and flame resistance. This formula may be excellent for sealing in buildings with known joint movement, is acceptable to addition of pigments for aesthetic appearance, and is compatible with CPVC piping. The formula exhibits increased adhesion to difficult substrates, increased moisture resistance, increased UV resistance, high volume solids for minimal shrinkage and fast cure, and has extremely low density.

TABLE 2

| Raw Material Category | Raw Material | % Weight | % Volume |
| --- | --- | --- | --- |
| Acrylic Polymer | Rhoplex EC-3814 | 81.61 | 40.96 |
| Defoamer | Foamstar 2420 | 0.34 | 0.20 |
| Surfactant | Disponal AFX 4070 | 1.12 | 0.54 |
| Biocide | Polyphase 678 | 0.18 | 0.08 |
| Biocide | Mergal 758 | 0.34 | 0.16 |
| Functional Filler | Aerosil 200 | 0.22 | 0.05 |
| Freeze/Thaw Additive, Blowing Agent | Prilled Urea | 3.35 | 1.30 |
| Dispersant | Orotan 731 dp | 0.36 | 0.29 |
| Microsphere | Expancel 909 DET 80 d15 | 1.57 | 53.97 |
| Filler | Talc MP4526 | 6.71 | 1.24 |
| Adhesion Promoter/ Coupling Agent | Organosilane KBM 403 | 0.18 | 0.09 |
| Functional Filler | Titanium Dioxide | 2.46 | 0.32 |
| HASE Thickener | TT-615 | 0.56 | 0.27 |
| pH Modifier | 20% Caustic Soda | 1.01 | 0.54 |
| | | 100 | 100 |

Table 3 is an example formula for a product having a density of 0.51 g/cm$^3$. This formula is an aqueous formulation capable of over 85% compression with the listed attributes, including smoke and flame retardant properties. It has potential additional use as a light-weight firestop sealant with the ability to apply from an aerosol can or airless sprayer as well as typical application methods. This formula may be CPVC pipe compatible.

TABLE 3

| Raw Material Category | Raw Material | % Weight | % Volume |
| --- | --- | --- | --- |
| Acrylic Polymer | Rhoplex EC-3814 | 78.85 | 39.03 |
| Defoamer | Foamstar 2420 | 0.32 | 0.19 |
| Surfactant | Disponal AFX 4070 | 1.08 | 0.51 |
| Biocide | Polyphase 678 | 0.17 | 0.07 |
| Biocide | Mergal K12N | 0.28 | 0.14 |
| Functional Filler | Aerosil 200 | 0.22 | 0.05 |
| Freeze/Thaw Additive, Blowing Agent | Prilled Urea | 3.24 | 1.24 |
| Dispersant | Orotan 731 dp | 0.35 | 0.27 |
| Carbon Black Pigment Dispersion | Black Dye Multijet 707 | 0.06 | 0.03 |
| Microsphere | Expancel 909 DET 80 d15 | 1.62 | 55.10 |
| Expandable Graphite | Asbury 3626 | 9.72 | 2.21 |
| Adhesion Promoter/ Coupling Agent | Organosilane KBM 403 | 0.19 | 0.09 |
| Functional Filler | Titanium Dioxide | 2.38 | 0.30 |
| ASE | Viscoatex 730 | 0.54 | 0.26 |
| pH Modifier | 20% Caustic Soda | 0.97 | 0.51 |
| | | 100 | 100 |

Table 4 is an example formula for a product having a density of 0.69 g/cm³. This formula is an aqueous formulation capable of over 80% compression. It may be used indoors, and allows for easy-to-clean for application equipment, and over-spray. This formula is excellent for fire resistance sealant in areas that need to meet building codes, is great for building with known joint movement, is acceptable to addition of pigments for aesthetic appearance, and is compatible with CPVC piping. This formula may be applied from an aerosol can or airless sprayer as well as typical application methods. The formula has potential additional uses such as parquet flooring adhesive. The product remains flexible at zero degrees Fahrenheit. Due to the choices of polymer, fillers, and additives, this formulation performs as a good air barrier with a standard permeance (perms) of 21 and thermal insulating attributes, has a VOC content of zero according to Method 24 testing, and an elongation at break of 214%.

TABLE 4

| Raw Material Category | Raw Material | % Weight | % Volume |
| --- | --- | --- | --- |
| Acrylate-Acrylonitrile Copolymer | Acronal 81 D | 61.71 | 40.36 |
| Diluent | Water | 3.61 | 2.50 |
| Defoamer | Foamstar 2420 | 0.17 | 0.13 |
| Surfactant | Disponil AFX 4070 | 1.19 | 0.82 |
| Biocide | Polyphase 678 | 0.12 | 0.07 |
| Biocide | Mergal 758 | 0.28 | 0.19 |
| Freeze/Thaw Additive, Blowing Agent | Prilled Urea | 2.09 | 1.08 |
| Dispersant | Tamol 851 | 0.95 | 0.55 |
| Color Pigment Dispersion | Phthalo Blue - Plasticolors | 0.36 | 0.21 |
| Microsphere | Expancel 909 DET 80 d15 | 1.07 | 44.26 |
| AP Flame Retardant | JJAZZ(4MA2) | 3.04 | 1.59 |
| Functional Filler | Mica WG325 | 6.66 | 1.64 |

TABLE 4-continued

| Raw Material Category | Raw Material | % Weight | % Volume |
| --- | --- | --- | --- |
| Functional Filler/Smoke and Flame Retardant | Aluminum Trihydrate SB432 | 15.22 | 4.40 |
| ASE Thickener | Thickener P-1172 | 1.52 | 0.99 |
| pH Modifier | 20% Caustic Soda | 2.02 | 1.21 |
| | | 100 | 100 |

Table 5 is an example formula for a product having a density of 0.67 g/cm³. This formula is an aqueous formulation capable of over 80% compression with the listed attributes, including smoke and flame retardant properties. It has potential additional use as a light-weight firestop sealant with the ability to apply from an aerosol can or airless sprayer as well as typical application methods. This formula is CPVC pipe compatible, has good adhesion to metal, and exhibits extremely low to no slump when applied.

TABLE 5

| Raw Material Category | Raw Material | % Weight | % Volume |
| --- | --- | --- | --- |
| Acrylic Polymer | Rhoplex EC-3814 | 72.45 | 47.19 |
| Diluent | Water | 5.03 | 3.38 |
| Defoamer | Foamaster 75 | 0.25 | 0.20 |
| Surfactant | Carbowet 109 | 0.87 | 0.54 |
| Biocide | Polyphase 678 | 0.17 | 0.09 |
| Biocide | Mergal K12N | 0.25 | 0.16 |
| Freeze/Thaw Additive, Blowing Agent | Prilled Urea | 2.51 | 1.27 |
| Dispersant | Orotan 731 dp | 0.34 | 0.35 |
| Color Pigment Dispersion | Phthalo Blue - Plasticolors | 0.30 | 0.17 |
| Microspheres | Expancel 909 DET 80 d15 | 0.92 | 41.23 |
| Functional Filler/Smoke and Flame Retardant | Aluminum Trihydrate SB432 | 6.70 | 1.88 |
| Mineral Thickener | Laponite RDS | 2.31 | 0.74 |
| Expandable Graphite | Asbury 3626 | 6.70 | 2.00 |
| ASE Thickener | Viscoatex 730 | 0.50 | 0.32 |
| Tertiary Amine pH Modifier | Vantex T | 0.70 | 0.49 |
| | | 100 | 100 |

Table 6 is an example formula for a product having a density of 0.99 g/cm³. This formula is an aqueous formulation capable of over 60% compression. This formula exhibits fast skinning and fast cure for an aqueous sealant. It may be used as a moisture resistant, fire retardant sealant for building penetrations, cracks, and gaps.

TABLE 6

| Raw Material Category | Raw Material | % Weight | % Volume |
| --- | --- | --- | --- |
| Styrenated Acrylic Polymer | Rhoplex 2019RX | 30.99 | 29.70 |
| Acrylic Polymer | Rhoplex EC-3000 | 30.65 | 29.40 |
| Diluent | Water | 3.00 | 2.97 |
| Defoamer | Foamaster 75 | 0.26 | 0.30 |
| Surfactant | Carbowet 109 | 0.68 | 0.62 |
| Plasticizer | Santicizer 148 | 1.70 | 1.65 |
| Biocide | Polyphase 678 | 0.07 | 0.06 |
| Biocide | Mergal K12N | 0.16 | 0.15 |
| Freeze/Thaw Additive, Blowing Agent | Prilled Urea | 1.36 | 1.01 |
| Dispersant | Orotan 731 dp | 0.34 | 0.52 |
| Color Pigment Dispersant | Phthalo Blue - Plasticolors | 0.22 | 0.18 |

TABLE 6-continued

| Raw Material Category | Raw Material | % Weight | % Volume |
|---|---|---|---|
| Microspheres | Dualite E065-135D | 1.36 | 20.81 |
| Filler | Magnapearl 1000 | 2.04 | 0.67 |
| Functional Filler/Smoke and Flame Retardant | Aluminum Trihydrate SB432 | 25.88 | 10.68 |
| HASE Thickener | Polyphobe 115 | 0.31 | 0.28 |
| ASE Thickener | Viscoatex 730 | 0.16 | 0.15 |
| Teriary Amine pH Modifier | Vantex T | 0.82 | 0.84 |
| | | 100 | 100 |

FIG. 1 provides a flowchart 100 illustrating an example method for producing the composition. At 102, the liquids are added to an empty vessel. Such liquids may include, for example: water, surfactant, dispersant, defoamer, and biocides. At 104, any additives are added to the vessel. Such additives may include, for example: anti-freeze agent, dye or pigments, plasticizer, coalescing agents, or any other additives discussed herein. At 106, the mixing sweep blades are activated. In some embodiments, a vacuum is activated if the polymer is dosed using a vacuum to pull the material into the vessel. The vacuum dissipates as the polymer is loaded. Otherwise, the polymer is dosed from a weigh hopper into the vessel.

At 108, the polymer is added to the mix until about half of the polymer is dosed, then a disperser is activated. At 110, the remaining polymer is dosed and the vacuum is activated (or reactivated) to approximately 28 inHg. At 112, the microspheres are added to the mixture. In some embodiments, this is achieved by using a weigh hopper filled with microspheres. The weigh hopper is on load cells that show the total weight. The microspheres are loaded into the mixer by loss of weight (that is, by subtracting the required weight in the formulation from the total weight in the hopper) and using a peristaltic pump to dose the microspheres into mixer. Once the dosing is complete, the peristaltic pump is deactivated and the pump valves at the hopper and mixer are closed. Due to their light-weight nature, the microspheres may form a cloud in the head space of the vessel. The composition is mixed while the microspheres settle. In some embodiments, the microspheres are dosed using a closed system to avoid irritating microsphere dust cloud.

Once the microspheres are clear from the head space and mixed into the liquids so there is adequate headspace in the vessel, the vacuum vent is released, the mixer is deactivated, and dry materials are added at 114. Then the sweep blades and disperser are activated. Examples of such dry materials may include: fillers such as mica, aluminum trihydrate, kaolin clay, magnesium hydroxide, aluminum phosphate, aluminum polyphosphate, fillite, calcium carbonate, talc, silica, or others or a combination of some depending on final product performance properties.

At 116, a vacuum is generated to wet out the dry materials as the product mixes. In some embodiments, this process causes the product to rise in the mixer. If the product rises beyond a desired level, the vacuum may be released and reactivated as needed. In some embodiments, the product is mixed for approximately ten minutes.

At 118, the vacuum is released and the thickener is added to the mixture while the sweep blades and disperser are running. At 120, the pH modifier is added, the mixer is closed and a vacuum is generated for approximately twenty minutes to ensure the product is deaerated for improved film formation in the finished product. In some embodiments, the thickener, water, and/or pH modifier may be adjusted as needed.

It should be appreciated that the above method is an example, and may be modified to achieve different performance parameters. Such modifications may be made to the order in which the materials are added, specific chemical additives used, timing related to opening and closing the mixer, use of the vacuum, and timing of the sweep blades and disperser.

In some embodiments, the disclosed composition may be packaged using a filtering process to remove any particles or agglomerates that could clog spray apparatus nozzle tips. In one embodiment, for example, after the finished product is mixed, it is drawn through a sieve with a vacuum pump. Another embodiment for filtering particles or agglomerates that could clog spray apparatus nozzle tips includes using a continuous filtering system with internal sweeps that remove the particles or agglomerates from the screen continuously and can be purged regularly as needed to allow the incoming filter pressure to remain close to the outgoing filter pressure. The disclosed filtering processes offer an improvement over other filtering methods, such as using a sock filter, which becomes quickly backed up with finished product due to the compressible nature of the composition which will quickly stop the product from flowing through by deforming and compacting the microspheres in the mastic inside the sock, which will build pressure until the sock is breached. Without the ability to filter, the mastic cannot be applied in a spray application.

A number of additional and alternative embodiments of the present disclosure may be provided without departing from the spirit or scope of the present disclosure as set forth in the aspects provided herein. These various embodiments are believed to be understood by one of ordinary skill in the art in view of the present disclosure.

What is claimed is:

1. A sealant composition comprising:
    greater than about 55 weight percent of an acrylate acrylonitrile copolymer;
    at least about 0.5 weight percent of pre-expanded compressible microspheres introduced by a closed mixing system into the copolymer;
    at least about 3 weight percent of a diluent;
    at least about 0.1 weight percent of a defoamer; and
    at least about 1 weight percent of a surfactant.

2. The sealant composition according to claim 1, wherein an uncured, liquid phase of the sealant composition has a first volume and is capable of being compressed from the first volume to a second volume that is less than the first volume.

3. The sealant composition according to claim 1, wherein when the sealant composition is in a cured state, the sealant composition is a closed-cell air barrier thermally insulating semi-foam and has a first cured volume and is compressible from the first cured volume to a second cured volume when under a pressure, and
    wherein the cured state of the sealant composition is configured to return to the first cured volume after the pressure is removed.

4. The sealant composition of claim 1 further comprising:
    at least about 0.3 weight percent of a color pigment dispersion.

5. The sealant composition of claim 1 further comprising:
    at least about 0.1 weight percent of a first biocide;
    at least about 0.5 weight percent of a freeze agent, a thaw agent and/or a blowing agent;

at least about 0.5 weight percent of a dispersant;
at least about 1.5 weight percent of a thickener;
at least about 0.5 weight percent of a pH modifier;
at least about 3 weight percent of a first flame retardant; and
at least about 3 weight percent of a first filler.

6. The sealant composition of claim 5, further comprising:
at least about 0.2 weight percent of a second biocide, and
at least about 15 weight percent of a second flame retardant.

7. A sealant composition comprising:
about 61.7 weight percent of an acrylate-acrylonitrile copolymer;
about 1 weight percent of pre-expanded compressible microspheres introduced under vacuum by a peristaltic pump of a closed mixing system into the copolymer;
about 3.6 weight percent of a diluent;
about 0.2 weight percent of a defoamer; and
about 1 weight percent of a surfactant.

8. The sealant composition of claim 7, wherein an uncured, liquid phase of the sealant composition has a first volume and is capable of being compressed from the first volume to a second volume that is less than the first volume.

9. The sealant composition of claim 7, wherein when the sealant composition is in a cured state, the sealant composition is a closed-cell air barrier thermally insulating semi-foam and has a first cured volume and is compressible from the first cured volume to a second cured volume when under a pressure, and
wherein the cured state of the sealant composition is configured to return to the first cured volume after the pressure is removed.

10. The sealant composition of claim 9, further comprising about 0.4 weight percent of a color pigment dispersion.

11. The sealant composition of claim 9, further comprising:
about 0.1 weight percent of a first biocide;
about 2 weight percent of a freeze agent, a thaw agent and/or a blowing agent;
about 1 weight percent of a dispersant;
about 1.5 weight percent of a thickener;
about 2 weight percent of a pH modifier;
about 3 weight percent of a first flame retardant; and
about 6.6 weight percent of a filler.

12. The sealant composition of claim 11, further comprising
about 0.3 weight percent of a second biocide; and
about 15 weight percent of a second flame retardant.

* * * * *